United States Patent [19]
Komiyama et al.

[11] Patent Number: 5,782,946
[45] Date of Patent: Jul. 21, 1998

[54] METHOD FOR MANUFACTURING PRESS-MOLDED GLASS OBJECT

[75] Inventors: Yoshizo Komiyama, Susono; Tetsuya Tanioka; Toshihisa Kamano, both of Mishima; Isao Matsuzuki, Numazu; Hirotaka Masaki, Mishima; Kazunori Urushibata, Shizuoka-ken, all of Japan

[73] Assignee: Toshiba Machine Co., Ltd., Tokyo, Japan

[21] Appl. No.: 593,920

[22] Filed: Jan. 30, 1996

[30] Foreign Application Priority Data

| Jan. 30, 1995 | [JP] | Japan | 7-012926 |
| Mar. 9, 1995 | [JP] | Japan | 7-049713 |
| Mar. 16, 1995 | [JP] | Japan | 7-057071 |

[51] Int. Cl.$^6$ ............................ C03B 11/00
[52] U.S. Cl. .................. 65/102; 65/64; 65/268; 65/275; 65/305
[58] Field of Search .................. 65/64, 102, 111, 65/104, 117, 268, 275, 318, 319, 322, 305

[56] References Cited

U.S. PATENT DOCUMENTS

| 4,629,489 | 12/1986 | Hirota et al. | 65/104 |
| 5,032,160 | 7/1991 | Murata et al. | 65/64 |
| 5,173,100 | 12/1992 | Shigyo et al. | 65/64 |
| 5,188,650 | 2/1993 | Nomura | 65/64 |
| 5,228,894 | 7/1993 | Sato et al. | 65/64 |
| 5,264,016 | 11/1993 | Komiyama | |
| 5,282,878 | 2/1994 | Komiyama et al. | 65/64 |
| 5,284,501 | 2/1994 | Monji et al. | 65/64 |
| 5,340,374 | 8/1994 | Komiyama et al. | 65/64 |

FOREIGN PATENT DOCUMENTS 4-260620  9/1992  Japan.

*Primary Examiner*—Steven P. Griffin
*Attorney, Agent, or Firm*—Cushman Darby & Cushman IP Group of Pillsbury Madison & Sutro LLP

[57] ABSTRACT

In press molding, a shaft (metal mold 13) is moved by positional or torque control to cause upper and lower molds to reach a set position slightly before a position where the upper and lower molds are set in a final mold closed state. As soon as the upper and lower molds reaches the set position, the control is switched to torque control using a small force which does not deform a glass material to perform feedback control. For this reason, when the cooling process is started, the mobile shaft is moved by the same amount as a contraction amount of the shaft, the actual position of the shaft is moved. However, a tight contact state between the molds and the glass material is kept without changing the thickness of the glass material, and positional control and torque control can be apparently performed at once. Thereafter, when temperature reaches an almost glass transition point, final pressing is performed. A position where the material is press-molded is exactly controlled by correcting an origin position of lower mold by closing the molds before press-molding. According to this method, a highly accurate optical element having thickness reproducibility can be obtained.

2 Claims, 10 Drawing Sheets

|  | PROGRAM I |
| --- | --- |
| ADDRESS | |
| 100 | G01 Z24.000F500 |
| 110 | G01 Z30.000F 20 |
| 120 | G200Z40.000F 20I 10E1V1 |
| 130 | G200Z40.000F 20I300E1V2 |
| 140 | G200Z40.000F 20I 50E1V3 |
| 150 | G01 Z 0.000F500 |

FIG. 9A

|  | PROGRAM II |
| --- | --- |
| ADDRESS | |
| 100 | G01 Z24.000F500 |
| 110 | G100Z29.000F 20I700P10000E1 |
| 120 | G200Z40.000F 20I 10E1V1 |
| 130 | G100Z29.150F 20I500P30000E1 |
| 140 | G200Z40.000F 20I 50E1V2 |
| 150 | G200Z40.000F 20I 30E1V3 |
| 160 | G01 Z 0.000F500 |

FIG. 9B

METHOD FOR MANUFACTURING PRESS-MOLDED GLASS OBJECT

BACKGROUND OF THE INVENTION

1. Field of the Invention

The present invention relates to a method for manufacturing a press-molded glass object such as a glass lens or a prism and apparatus therefor.

2. Description of the Related Art

Apparatus for manufacturing a press-molded glass object generally comprises a frame, a fixed shaft extending downward from the upper surface of the frame and fixed to the frame, a fixed mold attached to the lower end face of the fixed shaft, a mobile shaft opposing the fixed mold and vertically movably arranged, and a mobile mold attached to the upper end of the mobile shaft. In this apparatus, a glass material is arranged on the mobile mold, the mobile mold is moved upward to be in tight contact with the fixed mold, and the material is press-molded at a predetermined temperature, thereby manufacturing the object. Although a hydraulic cylinder or pneumatic cylinder is mainly used as a drive source for the mobile mold, noise or contamination generated by the drive source pose problems. In addition, when press molding is performed by only bringing the mobile mold and the fixed mold into tight contact with each other, shaping stability of the molded product, accuracy, and reproducibility are poor.

More specifically, a glass material is first heated.

Subsequently, it is heated to a predetermined temperature, press-molded, and then cooled to a temperature at which the material is extracted from the apparatus. In this cooling process, the glass material decreases in size more than the molds do, due to the difference between the coefficients of thermal expansion. Due to this shrinkage, the optical surface cannot be formed with high precision. The coefficient of thermal expansion of glass is several times larger in the temperature region higher than the transition point than in the temperature region lower than the transition point.

In a molding apparatus wherein a servo motor is used as a drive source, a glass material is arranged between a pair of upper and lower molds, the molds and glass material are heated, and the material is press-molded, the following method is known. That is, when the glass material is pressed, the upper and lower molds are not moved to the final tight contact position; they are kept away from each other by the distance corresponding to the shrinkage of the glass material. Subsequently, the glass material is cooled until its temperature becomes close to the transition point. At such a temperature, the glass material is finally pressed to obtain an optical element. Such a method is described, for example, in Jpn. Pat. Appln. KOKAI Publication No. 4-260620 and U.S. Pat. No. 5,264,016.

For example, Japanese Unexamined Patent Publication No. 4-260620 discloses a method in which a glass material is arranged between a pair of upper and lower molds, the molds are located at a position S1 or S2 where the upper mold and the glass material have a gap or the upper mold is in slight contact with the glass material until the temperature of the molds reaches a transition point temperature T2 at which the glass material can be deformed or a set temperature T1 which is lower than a temperature T3 almost equal to the temperature T2 by a predetermined amount, the glass material is pressed and held by the pair of molds at a set pressure P1 when the temperature of the molds reaches the set temperature T1, it is detected on the basis of moving of the molds that the glass material begins to be deformed when the temperature of the glass material reaches the temperature T2 or T3, and the temperature of the molds is considered as the temperature T2 or T3.

U.S. Pat. No. 5,264,016 discloses a method for manufacturing glass lenses in which the mold clamping force is unable to deform the lens blank when the temperature of the lens blank is below a transition point of the lens blank and the mold clamping force is able to deform the lens blank when the temperature of the lens blank is above the transition point.

However, even if the servo motor is used as described above, positional control and torque control cannot be performed at once. This means the follows. That is, when a material having low viscosity is pressed by positional control, and the set torque is to be obtained, the positions of the molds inevitably move. In contrast to this, when the molds are controlled by torque, and the molds are moved to the set position, the torque inevitably varies. In addition, when torque control is performed, and the molds reach the set position, the positional control has priority over the torque control. For this reason, the next program is disadvantageously started.

More specifically, when the upper and lower molds are positionally controlled to a set position where the upper and lower molds do not reach the final tight contact position, the next program is started immediately after the molds reach the set position. Even if the molds are held at the set position by timer setting, when a press shaft to which the molds are connected contracts in the cooling step, the molds are held at the set position because of the positional control. However, since the positional control can cope with a change in temperature, the tight contact state between the glass material and the molds cannot be held. That is, a pressing force acting on the glass material varies, a gap having a width corresponding to an amount of contraction of the press shaft is formed between the upper and lower molds, and the glass material is not held between the upper and lower molds. For this reason, if the glass material in the gap moves, the glass material is pressed in an "offset" state when the final pressing process is performed. Therefore, a nondefective product cannot be obtained.

When a mobile mold is controlled by torque control, and the mold reaches the set position, the positional control has priority over the torque control. For this reason, the next program is disadvantageously started.

As a countermeasure against this, the following method is available. That is, when the set position is set at a position (virtual tight contact position) above the actual mold tight contact position to prevent the mold from reaching the actual set position, the torque control can cope with a change in temperature. However, since the torque value exceeds the set torque value, the pressing force cannot be controlled. When the viscosity of the glass material is low, the mold may move to the final tight position because of the absence of resistance, and the thickness of a glass molded product cannot be controlled.

As described above, in the method of pressing the glass material without causing the upper and lower molds to reach the final tight position and then finally molding the material after cooling, it is impossible that the molds are kept being separated from the molds without changing the thickness of the glass in the molding process. That is, in the method above, a molded glass object (optical element) having high accuracy and no reproducibility in the thickness of the molded product cannot be obtained.

In addition, since a frame 1, a fixed shaft 2, and a mobile shaft 9 thermally expand in a heat-molding process, the following problem is posed in the thickness of a molded product. FIG. 10A shows a state wherein the temperature of the overall apparatus is T. FIG. 10B shows a state wherein the temperature of the overall apparatus is T+dT. When the temperature of the overall apparatus is T+dT, assume that the length of the frame 1 is $L_F+dL_F$; the length of the fixed shaft 2, $L_{AU}+dL_{AU}$; the length of the mobile shaft 9, $L_{AL}+dL_{AL}$; and the thickness of the glass element, t+dt. In this case, $$L_F+dL_F+(L_{AU}+dL_{AU})+(L_{AL}+dL_{AL})+(t+dt)$$

is satisfied. In this case, due to the differences among the thermal expansion coefficients of the frame 1, the fixed shaft 2, and the mobile shaft 9, the following relationship is established:

$$|dL_F| \ne |dL_{AU}+dL_{AL}|$$

For this reason, $$dt=|dL_F|-|dL_{AU}+dL_{AL}|$$

$$t \ne t+dt$$

is satisfied.

A limit switch 29 attached to an intermediate plate 1a gives an origin position $Z_0$ to the mobile shaft 9, a moving distance $Z_1$ from the origin position $Z_0$ is accurately controlled by positional control performed by a numerical control mechanism (NC). For this reason, although the thickness of the glass element is set to be t, the thickness of the glass element at a temperature T+dT is t+dt. The value dt indicates a slight amount of about several tens μm, but is important value for discriminating standardized products from non-standardized products when higher accurate glass elements are manufactured.

SUMMARY OF THE INVENTION

It is the first object of the present invention to provide a press-molding apparatus in which a molded glass object having a stable thickness can be always obtained by performing a combination between positional control and torque control to a mobile mold in press-molding, and a method therefor.

It is the second object of the present invention to provide a press-molding apparatus in which a molded glass object having a stable thickness is always obtained by controlling a pressing force by several stages when torque control is performed to a mobile mold in press-molding, and a method therefor.

It is the third object of the present invention to provide a method of producing a molded glass object in which, even if the relative distance between a fixed mold and a mobile mold varies by the thermal expansion of a frame, the fixed mold, and the mobile mold, a moving amount of the mobile mold is corrected to keep the relative distance between the fixed mold and the mobile mold constant, so that a molded object having a stable thickness can be always obtained, and an apparatus therefor.

According to the present invention, there is provided to a method for manufacturing a molded glass object such that a glass material arranged between a fixed mold and a mobile mold is press-molded at a predetermined molding temperature under predetermined molding conditions, comprising the steps of: heating both the molds and the material to a predetermined heating temperature between a glass softening point and a glass transition point; moving the mobile mold and press-molding the material until the mobile mold reaches a predetermined set position where the mobile mold and the fixed mold are in contact with the material without being in contact with each other; applying a predetermined pressing force which does not deform the material to the mobile mold at the set position, thereby holding the material between both the molds; cooling both the molds and the material; and final press-molding the material between both the molds by a pressing force which can deform the material at a temperature close to the glass transition point.

According to the present invention, there is provided to a method for manufacturing a molded glass object such that a glass material arranged between a fixed mold and a mobile mold is press-molded at a predetermined molding temperature under predetermined molding conditions, comprising the steps of: heating both the molds and the material to a predetermined heating temperature between a glass softening point and a glass transition point; moving the mobile mold and press-molding the material by a predetermined pressing force which can move the mobile mold to a predetermined set position where both the molds are in contact with the material without being in contact with each other; applying a predetermined pressing force which does not deform the material to the mobile, mold at the set point, thereby holding the material between both the molds; cooling both the molds and the material; and final press-molding the material between both the molds by a pressing force which can deform the material at a temperature close to the glass transition point.

According to the present invention, there is provided to a method for manufacturing a molded glass object such that a glass material arranged between a fixed mold and a mobile mold is press-molded at a predetermined molding temperature under predetermined molding conditions, comprising a method for correcting an origin position serving as a reference of moving of the mobile mold, the correcting method having: the first measuring step of performing idle press molding under predetermined molding conditions without heating the material to the molding temperature and arranging the material between the molds, thereby measuring an origin position of the mobile mold in the press molding; the second measuring step of performing idle press molding under predetermined molding conditions with heating the material to the molding temperature without arranging the material between the molds, thereby measuring an origin position of the mobile mold; the step of calculating an offset amount between both the origin positions measured by the first and second measuring steps; and the step of correcting an origin position of the mobile mold on the basis of the offset amount.

According to the present invention, there is provided to an apparatus for manufacturing a molded glass object such that a glass material is press-molded between a fixed mold and a mobile mold, comprising: a pair of molds, having a fixed mold attached to a fixed shaft and a mobile mold attached to a mobile shaft, for press-molding the material between the fixed mold and the mobile mold; moving means for moving the mobile shaft and mold to an arbitrary position; means for heating the fixed mold, the mobile mold, and the material; means for determining and holding a pressing force acting between the fixed and mobile molds at an arbitrary value; and control means for, when the material is heated by the heating means to a predetermined heating temperature higher than a glass transition point and press-molded between the molds until reaching to a set position where the fixed and mobile molds are not in tight contact with each other, causing the holding means to apply a predetermined pressing force which does not deform the material to the mobile mold to hold the material between the fixed and mobile molds, and, when the temperature of the material becomes a temperature close to the glass transition point by cooling, for controlling the moving means and the holding means such that the material is final press-molded by a pressing force which can deform the material.

According to the present invention there is provided to an apparatus for manufacturing a molded glass object such that a glass material is press-molded between a fixed mold and a mobile mold, comprising: a pair of molds, having a fixed mold attached to a fixed shaft and a mobile mold attached to a mobile shaft, for press-molding the material between the fixed mold and the mobile mold; moving means for moving the mobile shaft and mold to an arbitrary position; means for heating the fixed mold, the mobile mold, and the material; means for determining and holding a pressing force acting between the fixed and mobile molds at an arbitrary value; and control means for, when the material is heated by the heating means to a predetermined heating temperature higher than a glass transition point and press-molded between the molds until reaching to a set position where the fixed and mobile molds are in contact with the material without being in tight contact with each other to reach the set position, causing the holding means to apply a predetermined pressing force which does not deform the material to the mobile mold to hold the material between the fixed and mobile molds, and, when the temperature of the material becomes a temperature close to the glass transition point by cooling, for causing the moving means and the holding means to perform final press molding by a pressing force which can deform the material.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIGS. 9A and 9B show programs used in the optical element molding methods according to the first and second embodiments of the present invention.

DETAILED DESCRIPTION OF THE PREFERRED EMBODIMENTS

Figure 1:
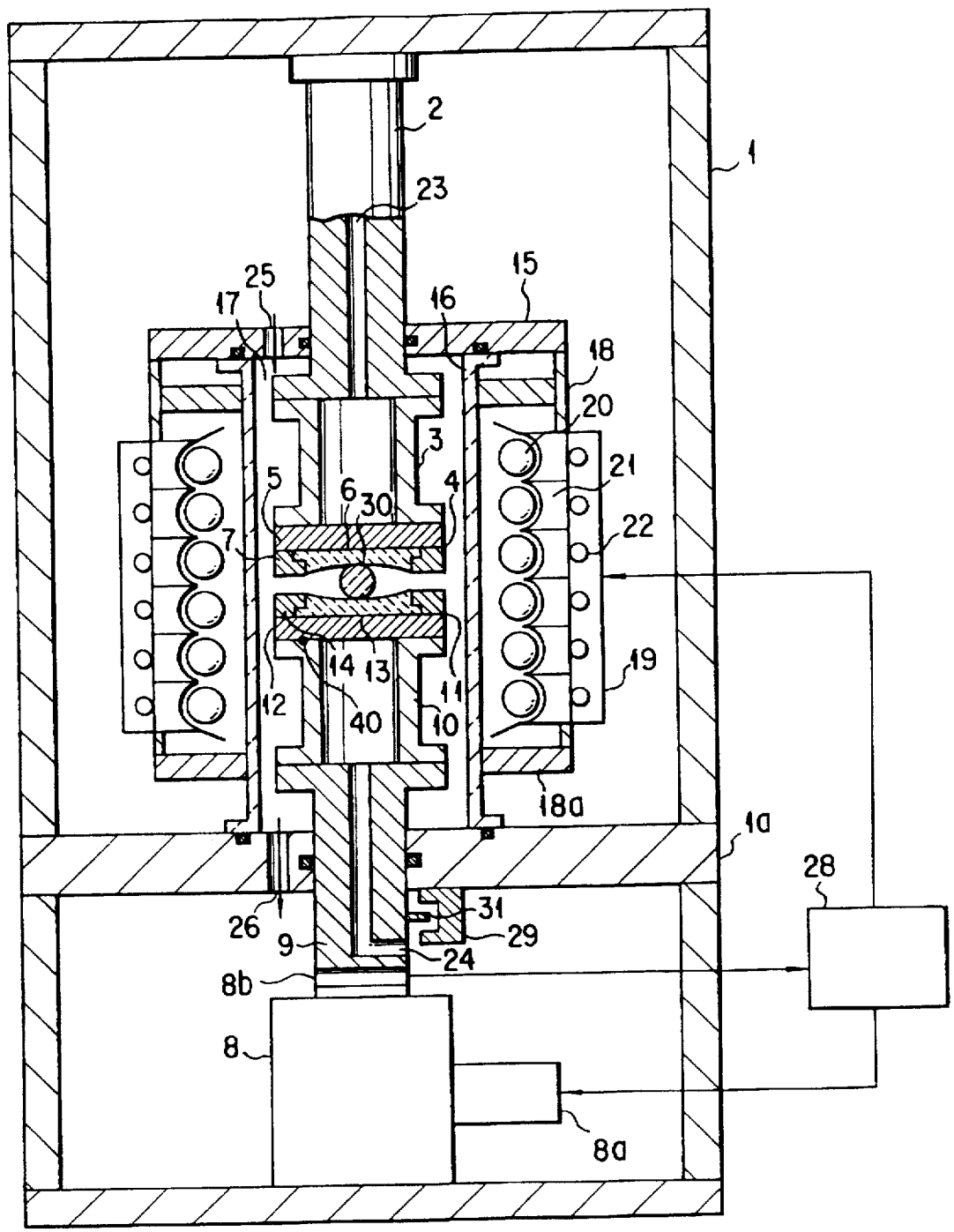
FIG. 1 is a schematic sectional view showing an optical element molding apparatus according to the present invention.

FIG. 1 shows an optical element molding apparatus. In this apparatus, a fixed shaft 2 extends downward from the upper portion of the frame 1, an upper mold assembly 4 is attached to the lower end of the fixed shaft 2 by bolts or the like (not shown) through an adiabatic cylinder 3 consisting of ceramic. The upper mold assembly 4 is constituted by a metallic die plate 5, an upper mold 6 consisting of ceramic or a refractory metal, and a fixed die 7, constituting part of the upper mold 6, for attaching the upper mold 6 to the metallic die plate 5.

In the lower portion of the frame 1, a drive unit 8 comprising a servo motor 8a having a position detecting function, a screw jack (not shown) for converting the rotating motion of the servo motor 8a into rectilinear motion thrust, and the like. A mobile shaft (press shaft) 9 is attached to this drive unit 8 through a load detector 8b. The mobile shaft 9 extends upward opposite to the fixed shaft 2. A control unit 28 is connected to the servo motor 8a, the moving speed, position, and pressing force (torque of the servo motor 8a) of the mobile shaft 9 can be controlled by a program input to the control unit 28. The pressing force of the mobile shaft 9 is controlled by a torque feedback control circuit arranged in the control unit 28. In this circuit, loads (pressing forces) acting on the upper mold assembly 4 and a lower mold assembly 11 are detected by the load detector 8b attached to the low end portion of the mobile shaft 9, and a current value applied to the servo motor 8a is closed-loop-controlled by the difference between each load and a set pressing force set in the control unit 28, thereby pressing force between the assemblies 4, 11 is controlled. The position of the mobile shaft 9 is controlled by a position control circuit arranged in the control unit 28. This position control circuit operates the position detecting function of the servo motor 8a to control the position of the mobile shaft 9.

An adiabatic cylinder 10 having the same arrangement as that of the adiabatic cylinder 3 is attached to the upper end of the mobile shaft 9, and the lower mold assembly 11 is attached to the upper end of the mobile shaft 9 through the adiabatic cylinder 10. Like the upper mold assembly 4, the lower mold assembly 11 is constituted by a die plate 12, a lower mold 13, and a mobile die 14. A glass material 30 is arranged on the lower mold 13.

A bracket 15 vertically moved by a driven unit (not shown) is movably engaged with the fixed shaft 2. An outer cylinder 18 is attached to the bracket 15, and a pipe support 18a and a lamp unit 19 are attached to the outer cylinder 18. A transparent quartz pipe 16 surrounding the pair of upper and lower mold assemblies 4 and 11 is attached to the pipe support 18a. The upper and lower end portions of the transparent quartz pipe 16 are brought into airtight contact with an intermediate plate 1a through which the bracket 15 and the mobile shaft 9 pass, and the intermediate plate, 1a the transparent quartz pipe 16, and the bracket 15 define a molding chamber 17 for cutting off the surroundings of the upper and lower mold assemblies 4 and 11 from the open air. The lamp unit 19 is attached to the inner surface of the outer cylinder 18, and the lamp unit 19 comprises an infrared lamp 20, a reflecting mirror 21, arranged in the rear of the infrared lamp 20, for reflecting an infrared beam to a quartz pipe side, and a water-cooled pipe 22, arranged on outer surface of the reflecting mirror 21, for cooling the reflecting mirror 21. This lamp unit 19 is connected to the heating temperature control circuit of the control unit 28. The control unit 28 controls a timing and an output at which the upper and lower mold assemblies 4 and 11 are heated.

Gas supply paths 23, 24, and 25 for making an inert gas atmosphere in the molding chamber 17 or cooling the mold assemblies 4 and 11 are formed in the fixed shaft 2, the mobile shaft 9, and the bracket 15. An inert gas can be supplied into the molding chamber 17 at a predetermined flow rate through a flow rate control gauge (not shown). The inert gas supplied into the molding chamber 17 is exhausted from an exhaust port 26.

A limit switch 29 is attached to the lower surface of the intermediate plate 1a, and a position detection terminal 31 is attached to the mobile shaft 9. When the position detection terminal 31 reaches the upper-limit or lower-limit portion of the limit switch 29, the position detection terminal 31 detects this. Note that the limit switch 29 and the position detection terminal 31 are not used in the first embodiment of origin position correcting methods, which is described later.

Figure 2:
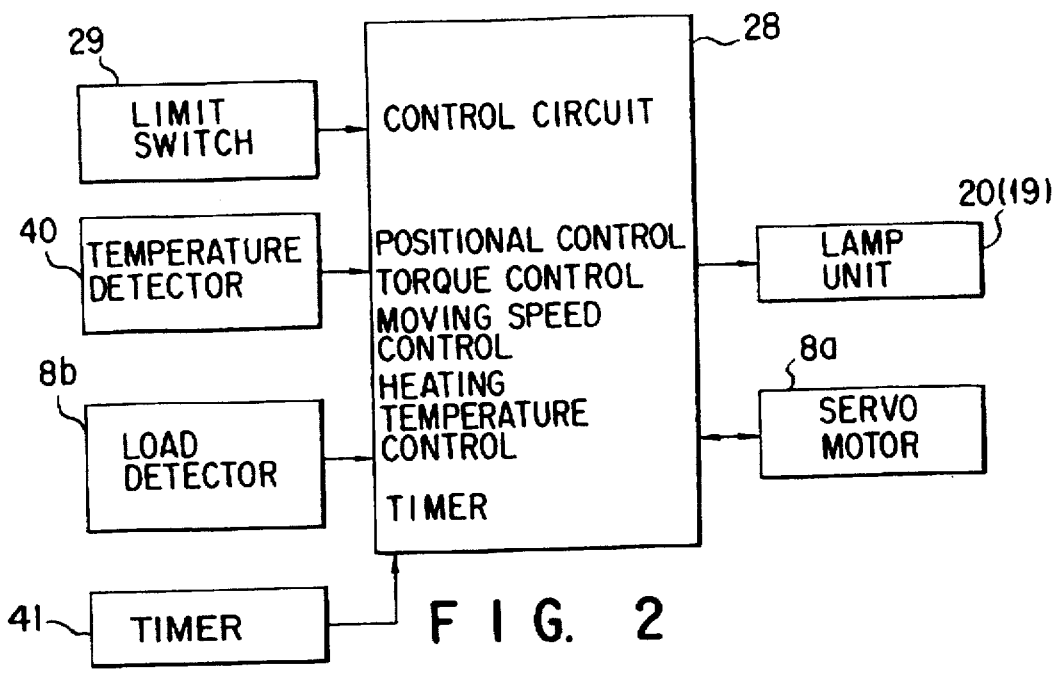
FIG. 2 is a schematic block diagram showing a control unit for the optical element molding apparatus according to the present invention.

FIG. 2 shows the control unit 28. This control unit comprises a position control circuit for the mobile shaft 9, a torque control circuit, a moving speed control circuit, a heating temperature control circuit for the lamp unit 19, and the like. The control unit 28 is connected to a temperature detector 40, a timer 41, the load detector 8b, the servo motor 8a, the infrared lamp 20 of the lamp unit 19, and the limit switch 29. The position of the mobile shaft 9 is detected on the basis of a signal from the servo motor 8a with reference to a predetermined origin position, and the mobile shaft 9 is controlled by the position control circuit to reach a predetermined set position. The pressing force (output torque of the servo motor 8a) between the upper mold 6 and the lower mold 13 is detected by the load detector 8b, and the torque is controlled by the torque control circuit to be a predetermined set value. The heating temperature of a glass material 30 for a glass object is detected by the temperature detector 40 such as thermo couple detecting the temperature of the lower assembly 11, and the material 30 is heated to a predetermined temperature by the heating temperature control circuit. A heating time for the material 30 is set to be a predetermined time by the timer. When the predetermined time has passed, press molding is started, and cooling is started. In the present invention, at least two pressing processes are performed by controlling the position or the pressing force, and timings at which the pressing processes are determined on the basis of a detection signal from the temperature detector 40 or the timer.

Figure 4A:
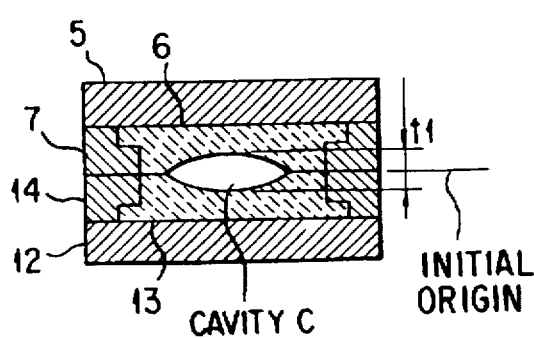
FIGS. 4A to 4C are views for sequentially explaining the origin position correcting method of the optical element molding method according to the present invention.
Figure 4B:
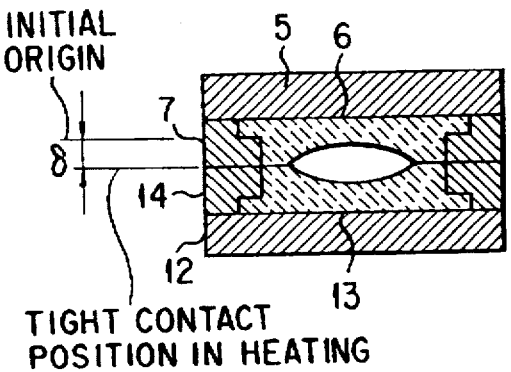
Figure 4C:
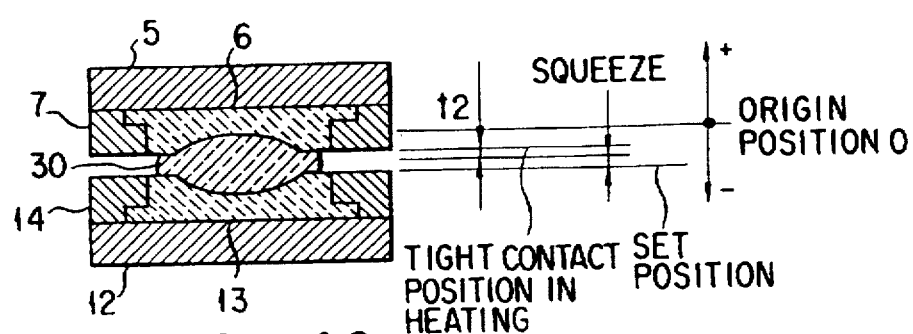
Figure 3:
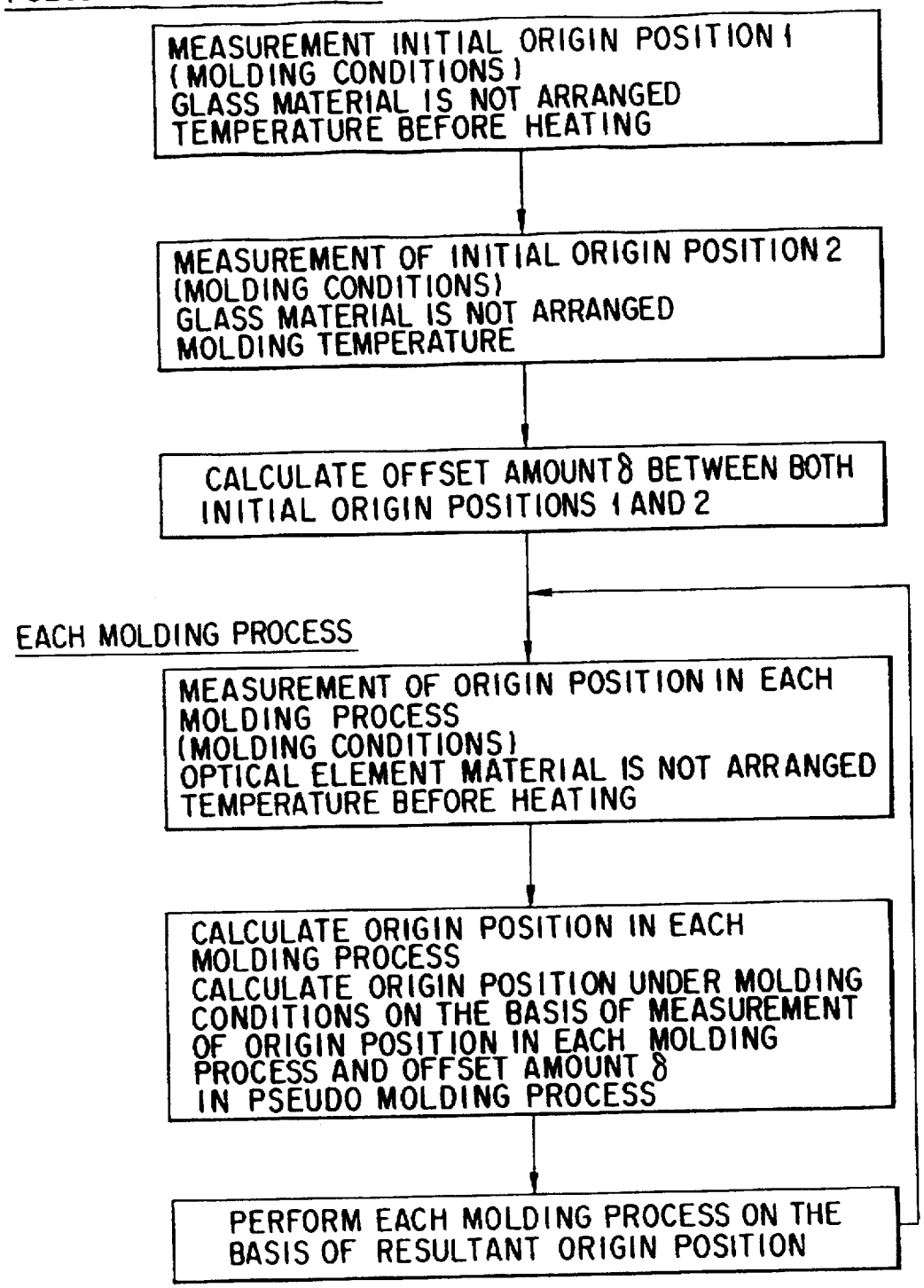
FIG. 3 is a flow chart showing an origin position correcting method of an optical element molding method according to the present invention.
Figure 5A:
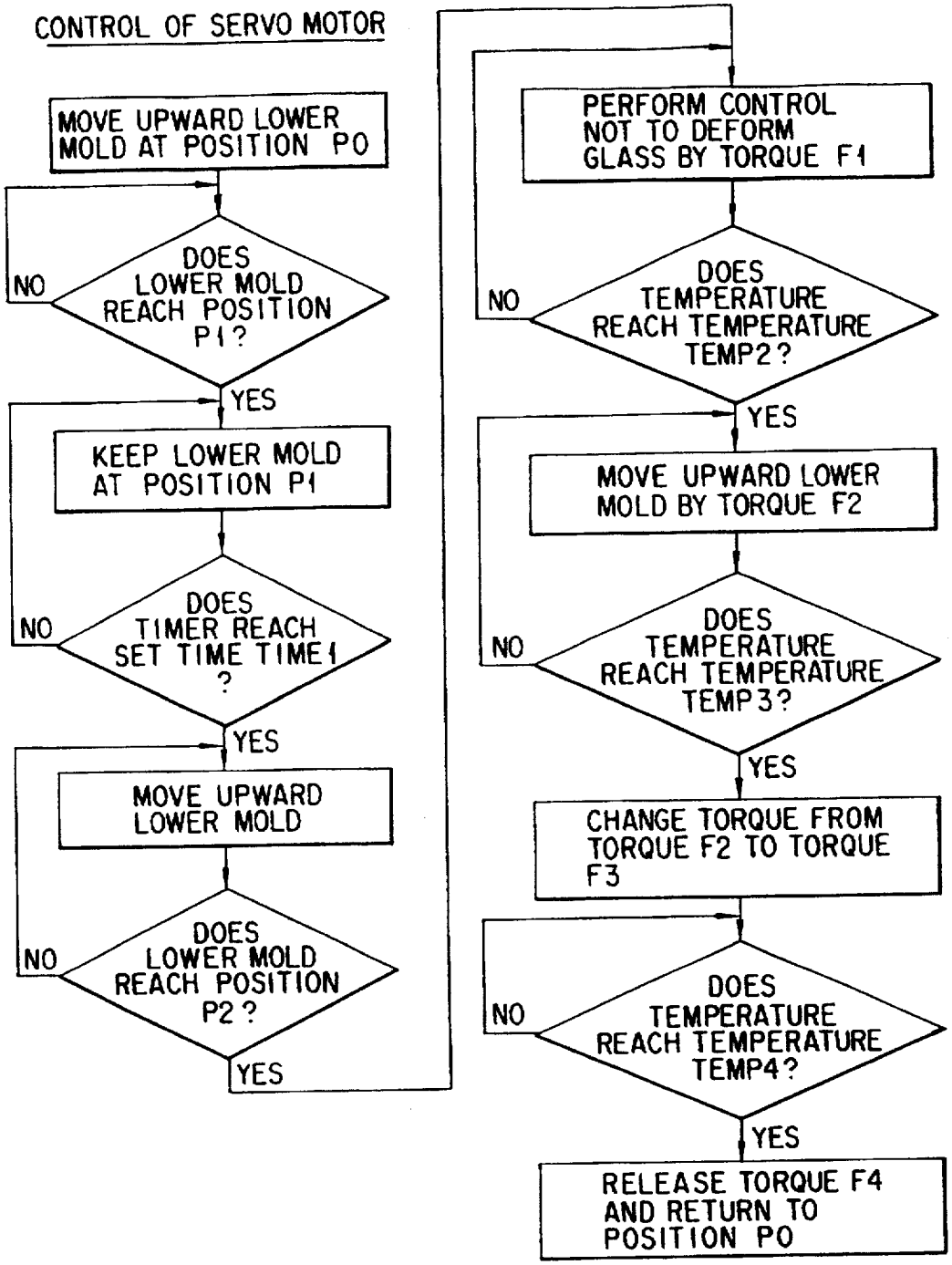
FIGS. 5A and 5B are flow charts of an optical element molding method according to the first embodiment of the present invention.
Figure 5B:
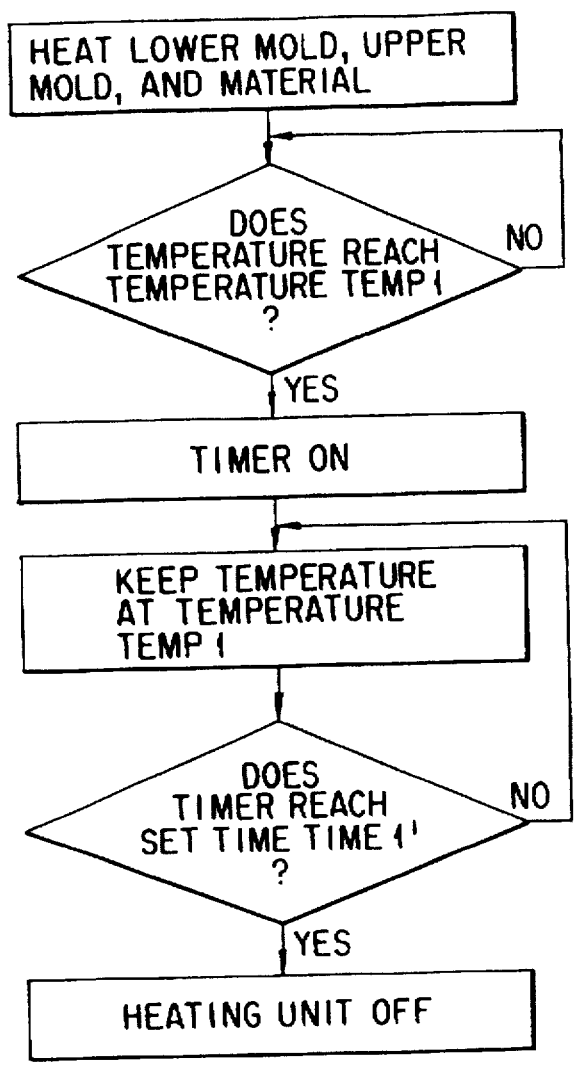
Figure 6:
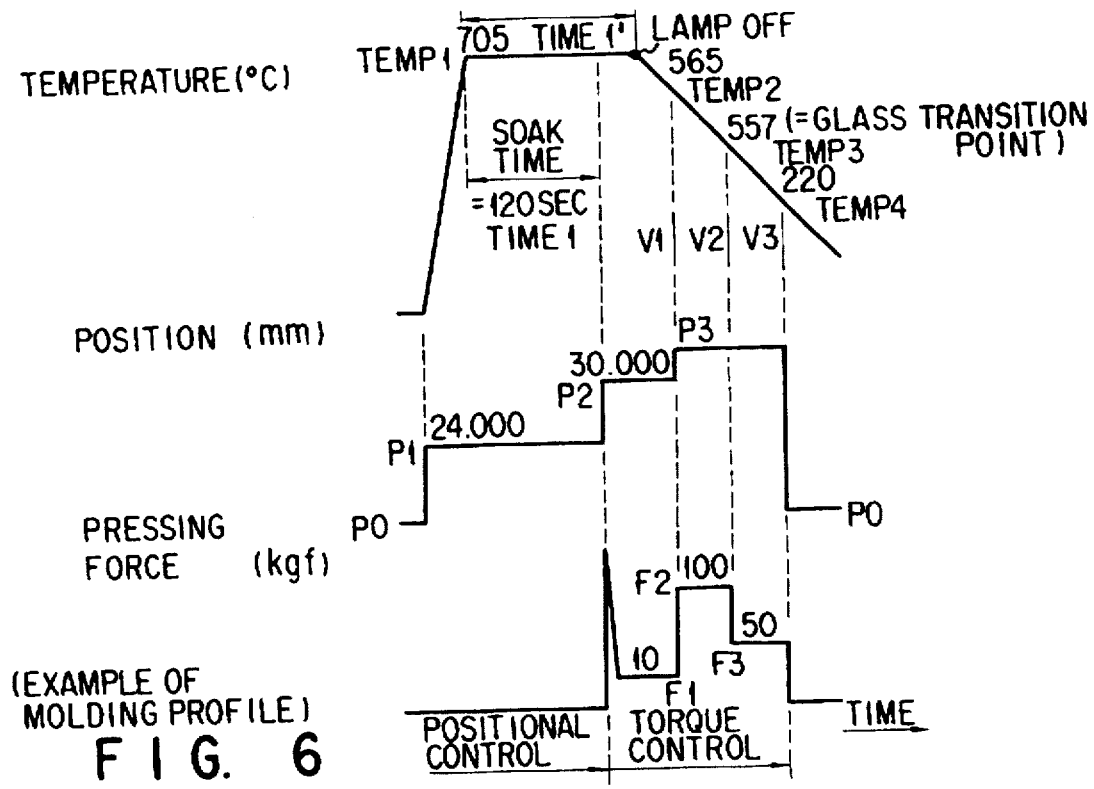
FIG. 6 is a timing chart of the optical element molding method according to the first embodiment of the present invention.

An origin position correcting method of the optical element molding method according to the present invention will be described below with reference to FIGS. 3 and 4A to 4B.

[First Embodiment of Origin Position Correcting Method]
[Pseudo Molding Process]

An offset amount δ between a tight contact position at room temperature before heating and a tight contact position in molding is calculated.

When upper and lower mold assemblies 4 and 11 are not heated by the lamp unit 19, and no optical element material (glass material) is arranged between the molds 6 and 13, a machine initialize signal is supplied to the molding apparatus. The mobile shaft 9 to which the upper and lower mold assemblies 4 and 11 is attached begins to move upward in response to this signal, and the mobile die 14 is brought into tight contact with the fixed die 7 (see FIG. 4A).

At this time, the pressing force acting on the mobile die 14 pressed on the fixed die 7 is set to be equal to a pressing force used when press molding is actually performed. While the timer counts predetermined seconds, after the press state is held, the tight contact position is set to be an initial origin position (Z=0 mm) serving as a positioning reference of the position control circuit. This initial origin position is input to the control unit 28 through the position detector (not shown) of the servo motor 8a. Note that reference symbol t1 in FIG. 4A denotes the thickness of a cavity C formed by the upper mold 6 and the lower mold 13.

The mobile shaft 9 is moved downward to a position of Z=−50 mm and on stand-by, and heating by the lamp unit 19 is started without setting the optical element material 30 on the upper surface of the lower mold 13, the lower mold assembly 11 is moved upward according to upward moving of the mobile shaft 9, and gradual pseudo press-molding process is executed. The fixed shaft 2, the mobile shaft 9, and the frame 1 thermally extend by heating performed by the lamp unit 19. According to the thermal expansion, the position of the fixed die 7 is offset, and the tight contact position between the upper and lower mold assemblies 4 and 11 at a high temperature, as shown in FIG. 4B, does not coincide with the tight contact position (initial origin) at room temperature before heating, thereby generating an offset amount δ.

In the above process, the tight contact position of the upper and lower mold assemblies 4 and 11 under the actual molding conditions (molding temperature and pressing force) is detected, the offset amount value δ between the initial origin and the tight contact position in heating is calculated. This offset amount value δ is input to the control unit 28 through the position detector of the servo motor 8a.

[Origin Correction in Molding Process]

Origin correction is performed in the actual molding process.

Before molding, when the upper and lower mold assemblies 4 and 11 are not heated by the lamp unit 19, and no glass material is arranged between the molds, a molding operation is performed by the molding apparatus. The mobile shaft 9 to which the lower mold assembly 11 is attached begins to move upward, the mobile die 14 is brought into tight contact with the fixed die 7. At this time, a pressing force acting on the mobile die 14 pressed on the fixed die 7 is set to be equal to a pressing force used when press molding is actually performed. While the timer counts predetermined seconds, after the press state is held, the tight contact position is set to be an origin position serving as a positioning reference of the position control circuit. This origin position is input to the control unit 28 through the position detector of the servo motor 8a. The origin position is corrected on the basis of the offset amount δ which is calculated in advance, thereby obtaining a tight contact position in heating. The obtained tight contact position in heating is set in the position control circuit as origin position information after correction.

According to this origin correction method, the lower mold assembly is brought into contact with the upper mold assembly once, and the origin position is corrected with reference to the position where the lower and upper mold assemblies are in contact with each other. When the above origin correcting operation is executed before press molding, the relative distance between the upper and lower molds can be always kept constant regardless of thermal expansion of the apparatus such as the frame. Reproducibility of thickness accuracy of a molded product can be improved. In addition, a defective product having a thickness error which exceeds an allowable thickness error is prevented from being manufactured. In addition, since it is not necessary to keep the temperature of the frame and the like constant the apparatus is not complicated. Products can be efficiently manufactured by using a simple and cheap apparatus. The productivity of products is improved.

[Embodiment of Molding Process]

After the origin correction is performed as described above, the respective molding processes are executed. An optical element molding method according to the present invention will be described below with reference to FIGS. 4C, 5, 6, and 9A.

The bracket 15 shown in FIG. 1 is moved upward along the fixed shaft 2 to open the molding chamber 17, and the glass material 30 is placed on the lower mold 13. As the glass material 30, a sphere having an outer diameter of 9 mm and a nitric seed BK-7 (transition point=557° C. and softing point=719° C.) was used.

The bracket 15 is moved downward, and the bracket 15, the transparent quartz pipe 16, and the intermediate plate 1a define the closed molding chamber 17. Inert gases are supplied from the gas supply paths 23, 24, and 25 into the molding chamber 17 to set the inside of the molding chamber 17 in an inert gas atmosphere. A supply time of the inert gases is set by the control unit 28. For example, the supply time is set to be 10 seconds in consideration of the capacity of the molding chamber 17 and a supply rate.

When the supply time is up, a command:

G01Z24.000F500 of the row indicated by address 100 in the program shown in FIG. 9A is executed. In this case, G01 denotes a linear interpolation code (position control code) used in a general NC apparatus; Z, a reach position (absolute amount: mm from the origin); and F, a moving speed (mm/min); F. Therefore, according to the command of the row of address 100, the mobile shaft 9 moves upward at a speed of 500 mm/min to a position of 24.000 mm (P1). The upward moving amount of the mobile shaft 9 is counted by an encoder (not shown) incorporated in the servo motor 8a. When the mobile shaft 9 reaches a position of 24.000 mm, the mobile shaft 9 is stopped. This position is the position where the glass material 30 and the upper mold 6 whose positions are confirmed in advance have a slight gap, and is a pre-heating position for heating the glass material 30 to a temperature at which the glass material 30 can be pressed. Note that the tight contact position between the upper and lower molds is a position of 30.500 mm.

When the mobile shaft 9 reaches the pre-heating position, the control unit 28 holds the mobile shaft 9 at this position, and the control unit 28 performs control to prevent the next program from being started before a soak time (time 1) (to be described later) is up.

When the mobile shaft 9 reaches the pre-heating position, the upper and lower mold assemblies 4 and 11 and the glass material 30 are heated by the lamp unit 19 through the transparent quartz pipe 16. The heating of the upper and lower mold assemblies 4 and 11 and the glass material 30 is controlled such that an output from a temperature detector 40 and an output from the infrared lamp 20 based on the output from the detector 40 are controlled by the control unit 28, the temperature of the glass material 30 is controlled to be 705° C. (Temp 1).

Since the temperature of the glass material 30 cannot be directly measured, the temperature of the lower mold assembly 11 is used in place of the temperature of the glass material 30. For this reason, a certain time (Soak Time) required to heat the glass material 30 to 705° C. is preferably set. In consideration of the material and heat capacity of the molds, Soak Time=120 seconds was set in this time. That is, the temperature of the lower assembly 11 reaches 705° C., a detection signal from the temperature detector is output to the control unit 28, a signal is output from the control unit 28, thereby operating the timer. When Soak time=120 seconds is detected by the timer, i.e., when Soak Time is up, as the next program, a command:

G01Z30.000F20 of the row indicated by address 110 is executed. More specifically, the drive unit 8 is driven and positionally controlled by the control unit 28 to move the mobile shaft 9 at a moving speed of 20 mm/min until the mobile shaft 9 reaches a position (P2) of 30.000 mm, thereby the material is press molded. In this case, the position of 30.000 mm is set on the basis of the origin position which is corrected in advance, and the position is 0.5 mm below the tight contact position (30.500 mm) of the upper and lower molds which are heated to 705° C.

The set position (30.000 mm) slightly before the tight contact position is set as follows. That is, when the thickness of a molded product is represented by t, the following relationship is established:

molded product thickness t =t1+t2=t1+{(−set position)+tight contact position in heating−squeeze}=t1−set position+tight contact position in heating−squeeze=cavity thickness (t1) of upper and lower molds 6 and 13 in tight contact state+tight contact position in heating−squeeze in final pressing−set position Note that t denotes the thickness of the molded product; t1 is the cavity thickness of the upper and lower molds in the tight contact state; and t2, a gap between the upper and lower molds held in the final pressing process. The values t, t1, and t2 and the squeeze are set by the control unit 28 in advance depending on the type of an optical element to be press-molded. The tight contact position in heating in the above equation is a value calculated by performing the above idle molding process with respect to the initial origin. This value is set to be almost equal to an offset amount between the tight contact position in press molding and an origin position corrected before the press-molding process. When the origin correcting method described above is executed, an error of the relative distance between the upper and lower molds in the press-molding process is reduced. When the mobile shaft 9 is moved upward by positional control, the glass material 30 is press-molded between the upper and lower molds 6 and 13. Note that the thickness of the glass material 30 after pressing is expected to be 3.026 mm by calculation based on the gap between the upper and lower molds 6 and 13.

When the mobile shaft 9 reaches the set position (position P2 of 30.000 mm) in response to the above command, a command:

G200Z40.000F20I10E1V1 of a row indicated by address 120 is immediately executed.

In this case, a G200 code is a torque control code developed for a molding apparatus, and is used to set a pressing force on the mobile shaft 9 to be a predetermined value. In this case, a Z code denotes a reach target position (absolute value; mm from the origin); F, the intended moving speed (mm/min) of the mobile shaft; an I code, a pressing force (kgf); an El code, to perform torque feedback control to hold a set pressing force; and a V code, a forced stepping code.

In response to this command, the actual pressing force is detected by the load detector 8b, an output from the load detector 8b is supplied to the control unit 28 as a feedback signal, and a current value supplied to the servo motor 8a serving as a drive source is closed-loop-controlled to keep the set pressing force. While this control is performed, the mobile shaft 9 is tried to move at a intended moving speed of 20 mm/min and a pressing force of 10 kgf (F1) to reach a reach position of 40.000 mm. However, the shaft 9 does not move. Note that the set target position 40.000 mm is above the actual mold tight contact position for the following reason. That is, since the next program is started when the mobile shaft 9 reaches the set position, the set position is set to be a position (above the actual mold tight contact position) which the mobile shaft 9 cannot reach, thereby preventing the next program from being automatically started. The current program is shifted to the next program by a forced stepping code V1. That is, the glass material 30 in molding cannot be deformed at the pressing force of 10 kgf which is set in advance. In this program, the mobile shaft 9 is held at the position of 30.000 mm until the forced stepping code V1 is output, the thickness of the glass material 30 in molding is not deformed.

When a predetermined time (Time 1') is detected by the timer, the infrared lamp 20 is turned off, the cooling process is started. Meantime, however, torque feedback control is performed by the pressing force of 10 kgf which does not deform the glass material 30. For this reason, the mobile shaft 9 moves such that a contraction amount of the shaft generated in the cooling process is absorbed, and the moving amount is equal to the contraction amount. Therefore, the gap between the upper and lower molds 6 and 13 does not change. That is, the thickness of the glass material 30 in molding in the cooling process does not change. In addition, the pressing force of 10 kgf always acts on the glass material 30, and the upper and lower molds 6 and 13 are in contact with each other. For this reason, the pressing force acting on the glass material 30 and a cooling state in the glass material can be uniformed. Furthermore, since the glass material 30 does not move, the final pressing operation (to be described later) does not performed in a state wherein the glass material 30 is "offset".

When the temperature reaches a temperature 565° C. (Temp 2) which is set in advance and slightly higher than the transition point, the forced stepping code V1 is output, a command:

G200Z40.000F20I100E1V2 of a row indicated by address 130 in the program is executed. In response to this command, in the same torque feedback control as in the row indicated by address 120, a pressing operation is performed at a moving speed of 20 mm/min, at a set position of 40.000 mm by a pressing force of 100 kgf (F2). When the transfer surface of the mold is pressed on the glass material 30 again by the set pressing force of 100 kgf, the transfer characteristics can be made further reliable.

Since it is confirmed that the mobile shaft 9 moves upward by 2 μm in this step, the thickness of the optical element obtained as a result is expected to be 3.024 mm. This operation is executed until the temperature of the glass material 30 reaches 557° C. (Temp 3=glass transition point).

When the temperature of the glass material 30 reaches 557° C. (Temp 3), a forced stepping code V2 is output. In this case, a command:

G200Z40.000F20I50E1V3 of a row indicated by address 140 in the program is executed, and the torque feedback control at the set pressing force of 100 kgf (F2) is switched to the torque feedback control at the set pressing force 50 kgf (F3).

This process is formed to hold contact between the upper and lower molds 6 and 13 and the glass material 30 and to uniform the pressing force acting on the glass material 30 and the cooling state in the glass material. Since this operation is performed at the transition point or less, the shape of the glass material 30 does not change.

When the temperature of the glass material 30 reaches a temperature of 220° C. (Temp 3) which is set in advance, a forced stepping code V3 is output, a command:

G01Z0.000F500 of a row indicated by address 150 in the program is executed, and the mobile shaft 9 moves at a moving speed of 500 mm/min to the origin (0.000 mm). Thereafter, the molds are opened, the molding process is ended.

Press molding was performed by the above molding profile 35 times. The expected thickness of the optical element was 3.024 mm. Since the profile irregularities of the upper and lower molds 6 and 13 were about λ/10 (λ=about 633 nm), the transfer characteristics were confirmed with reference to this value.

Any optical element obtained as a result had a thickness= 3.024 mm±1 μm and a profile irregularity=about λ/10. Therefore, highly accurate optical element having an expected thickness could be obtained.

As another program, a certain time is set with reference to time at which Soak Time is up, and the switching operation (switching operation between the pressing force of 10 kgf and the pressing force of 100 kgf) between the rows indicated by addresses 120 and 130 may be performed after the set time has passed.

According to the embodiment, after the glass material is heated to a temperature which is equal to or higher than the transition point and lower than the softing point, the shaft (mold) is moved by positional control to a set position slightly before a position where the upper and lower molds are set in the final closed state so as to reach the set position. At this time, since moving of the shaft (mold) is controlled by a servo motor, the shaft can be accurately moved at good reproducibility.

As soon as the shaft reaches the set position, the control is switched to torque control, and torque feedback control is performed by a small force which does not deform the glass material. At this time, the positional control and the torque control can be apparently performed at once. When the cooling process is started, the thickness of the glass material in molding can be prevented from being changed, and the state wherein the molds are in tight contact with the glass material can be held. As a result, a highly accurate optical element having thickness reproducibility can be obtained.

When the final pressing operation is performed when the temperature of the glass material becomes almost transition point Tg, the transfer characteristics between the molds and glass material can be improved, and the accuracy of the molded optical element can be further improved.

[Another Molding Process]

Figure 8:
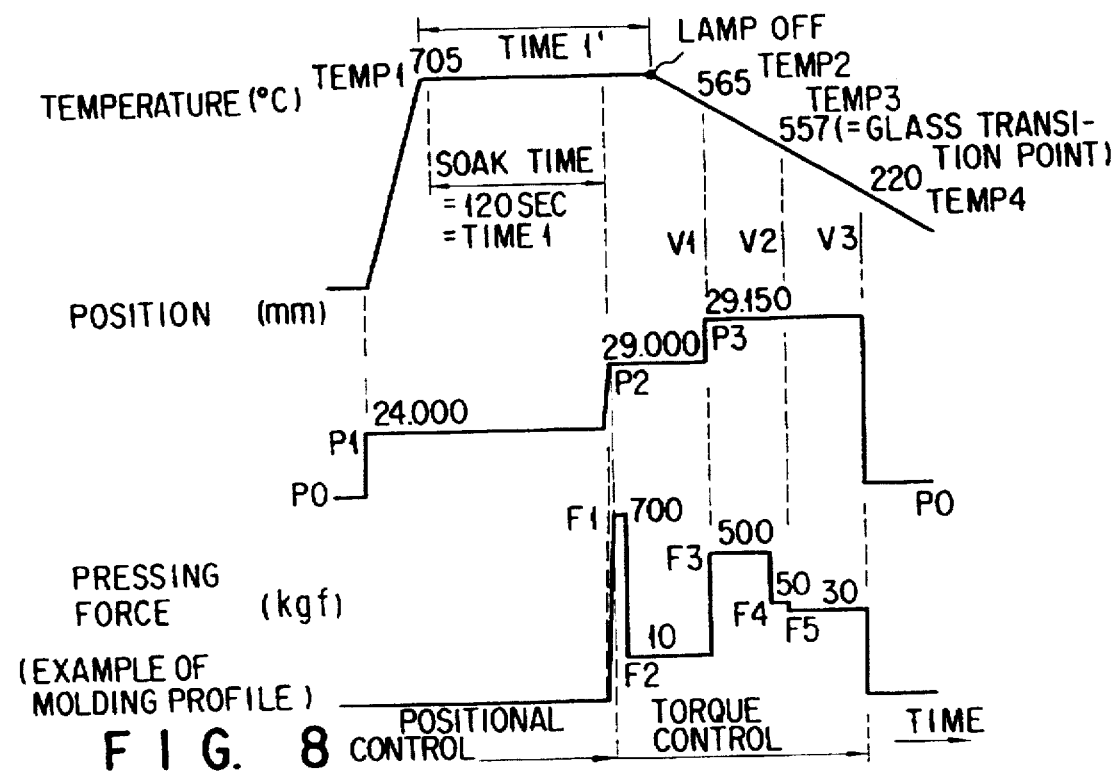
FIG. 8 is a timing chart of the optical element molding method according to the second embodiment of the present invention.
Figure 7A:
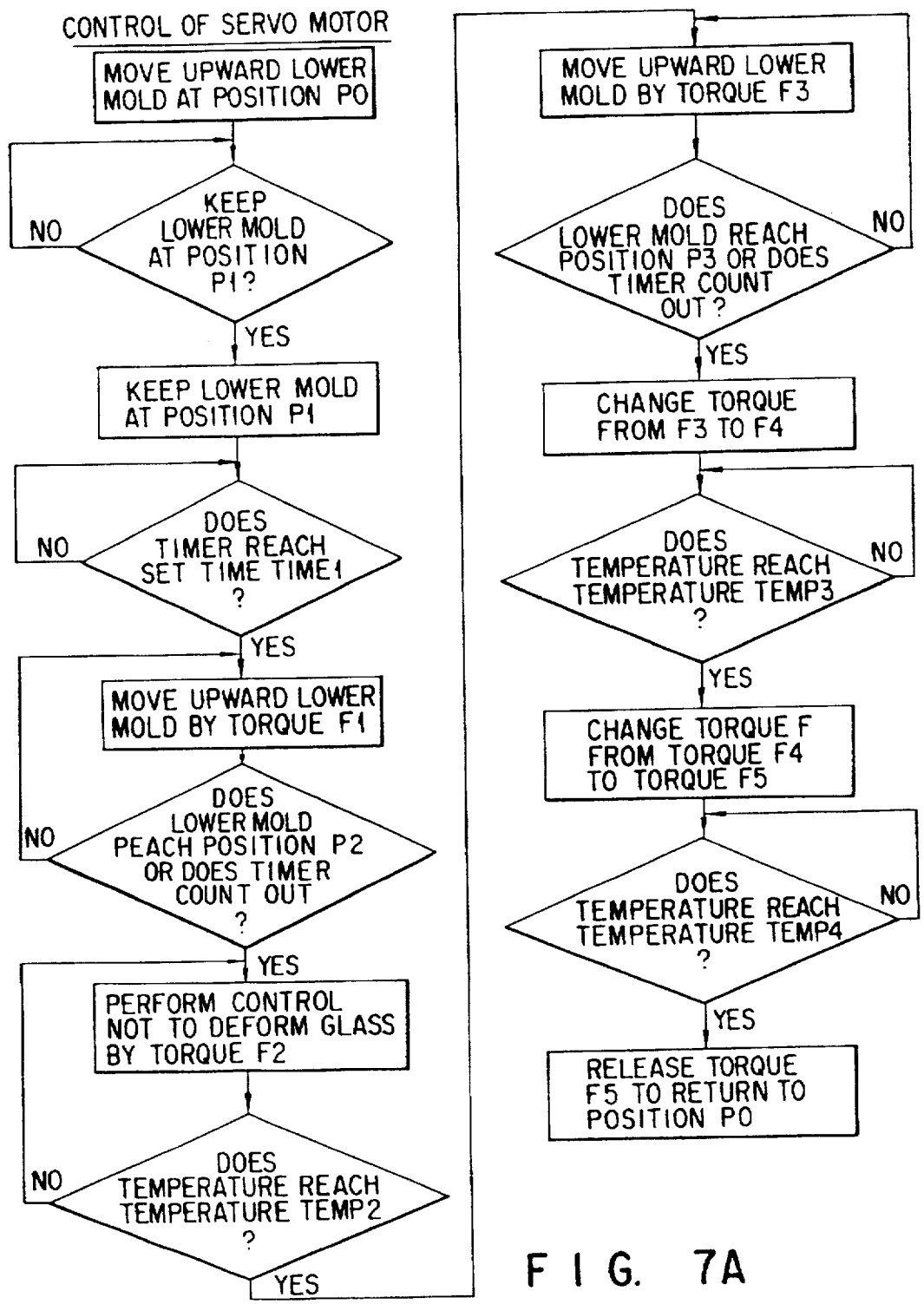
FIGS. 7A and 7B are flow charts of an optical element molding method according to the second embodiment of the present invention.
Figure 7B:
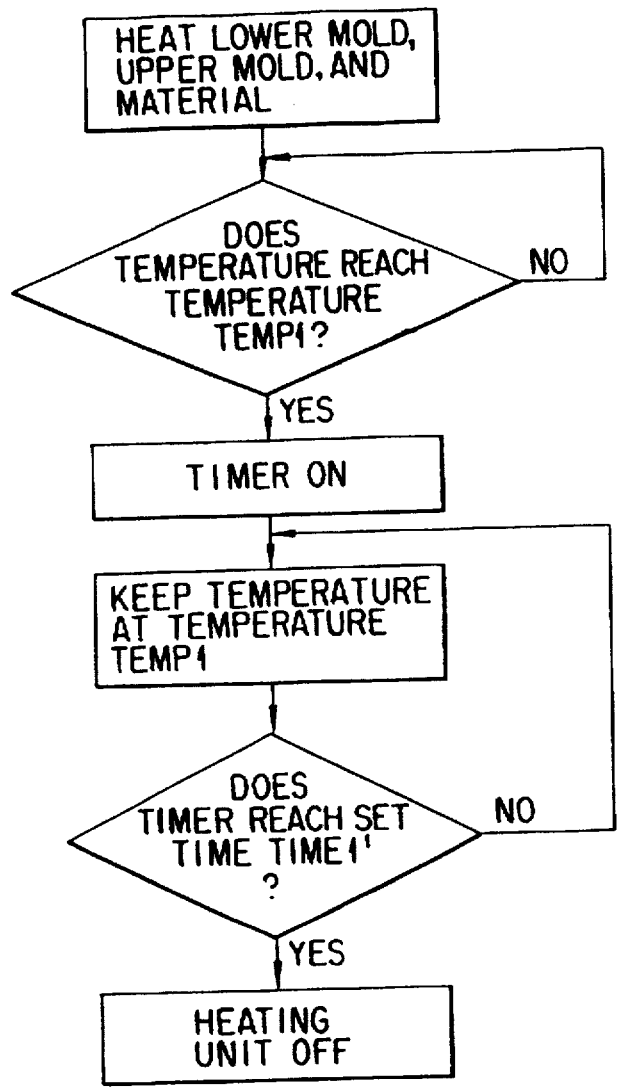
Figure 10A:
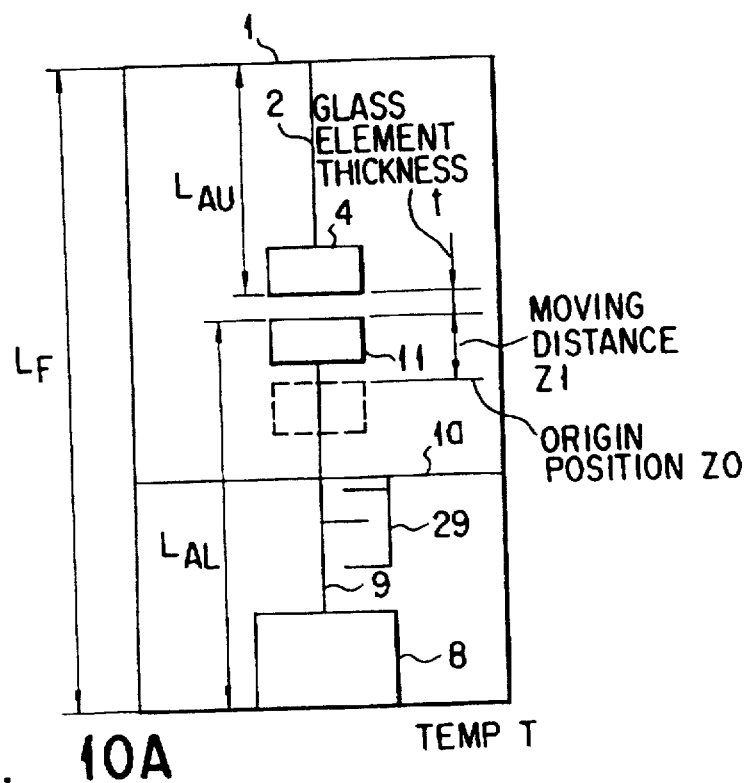
FIGS. 10A and 10B are views for explaining a change in thickness of an optical element by thermal expansion.
Figure 10B:
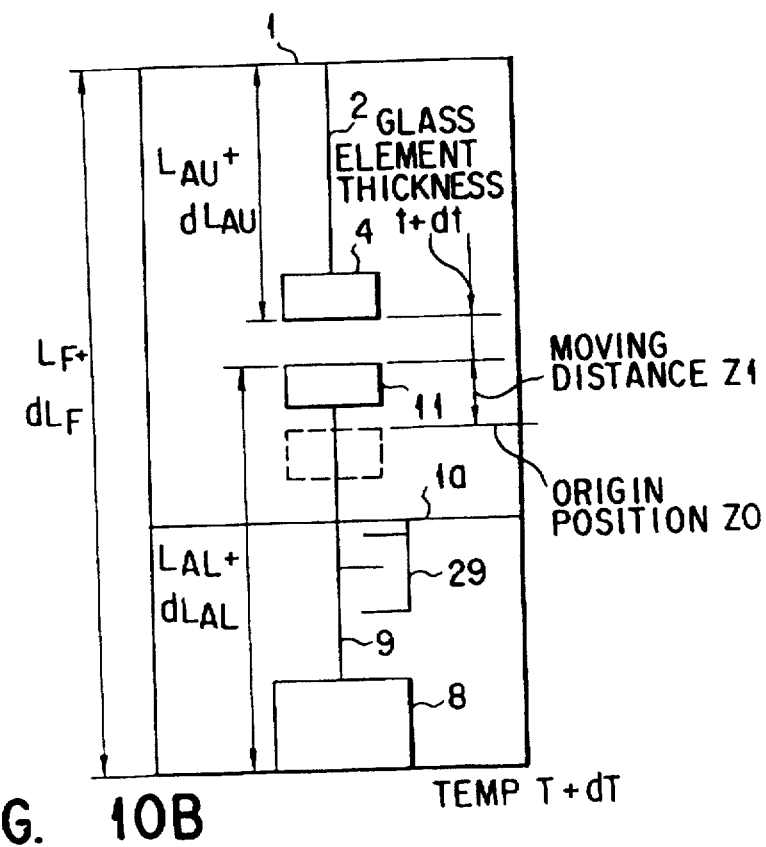

Another optical element molding method according to the present invention will be described below with reference to FIGS. 7, 8, and 10B.

The bracket 15 is moved upward along the fixed shaft 2 to open the molding chamber 17, and the glass material 30 is loaded onto the lower mold 13. As the glass material 30, a sphere having an outer diameter of 9 mm and a nitric seed BK-7 (transition point=557° C. and softing point=719° C.) was used.

The bracket 15 is moved downward, and the molding chamber 17 is closed by the transparent quartz pipe 16. Inert gases are supplied from the gas supply paths 23, 24, and 25 into the molding chamber 17 to set the inside of the molding chamber 17 in an inert gas atmosphere. A supply time of the inert gases is set by the control unit 28. The supply time is set to be 10 seconds in consideration of the capacity of the molding chamber 17 and a supply rate.

When the supply time is up, a command:

G01Z24.000F500 of the row indicated by address 100 in the program shown in FIG. 9B is executed. In this case, G01 denotes a linear interpolation code (position control code) used in a general NC apparatus. The mobile shaft 9 moves to the position of Z at a speed of F. Note that reference symbol Z denotes an absolute amount (mm); F, a moving speed (mm/min).

More specifically, according to the command of the row of address 100, the mobile shaft 9 moves upward at a speed of 500 mm/min from the origin, which is corrected as described above, to a position of 24.000 mm (P1). The upward moving amount of the mobile shaft 9 is counted by an encoder (not shown) incorporated in the servo motor 8a. The glass material 30 and the upper mold 6 whose positions are confirmed in advance are positioned by positional control at a position (P1=24.000 mm) where the glass material 30 and the upper mold 6 have a slight gap.

In general, when the positioning is performed by positional control, the next program is started in response to a signal indicating the mobile shaft 9 reaches the set position. Since the position is a pre-heating position for heating the glass material 30 to a temperature at which the glass material 30 can be pressed, the control unit 28 set the position such that the position is held until Soak Time (to be described later) is up (Time 1).

The upper and lower mold assemblies 4 and 11 and the glass material 30 are heated by the lamp unit 19 through the transparent quartz pipe 16. The heating of the upper and lower mold assemblies 4 and 11 and the glass material 30 is controlled such that an output from a temperature detector 40 and an output from the infrared lamp 20 based on the output from the thermo-couple 27 are controlled by the control unit 28, the temperature of the glass material 30 is controlled to be 705° C. (Temp 1).

Since the temperature of the glass material 30 cannot be directly measured, the temperature of the lower mold assembly 11 is used in place of the temperature of the glass material 30. For this reason, a certain time (Soak Time=Time 1) required to heat the glass material 30 to 705° C. is preferably set. In consideration of the material and heat capacity of the molds, Soak Time=120 seconds was set in this time.

When Soak Time is up, a command:

G01Z29.000F20I700P10000E1 of the row indicated by address 110 is executed.

In this case, a G100 code will be described below. The G100 code is a torque control code developed for an optical element molding apparatus, and is a command for moving the mobile shaft at a speed of F (mm/min) to the set position of Z (absolute amount; mm from the origin) to perform torque control by a pressing force of I (kgf). The torque feedback control can be performed to hold the set pressing force. For this reason, in response to the command of the row indicated by address 110, the mobile shaft is moved at a speed of 20 mm/min to a position of 29.000 mm (P2) from the origin to perform torque control by a pressing force of 700 kgf (F1). Since an E1 code is written in the program, a current value applied to the servo motor 8a serving as a drive source is closed-loop-controlled such that an actual pressing force is detected by the load detector 8b, an output from the load detector 8b is received by the control unit 28 as a feedback signal, and the set pressing force is held. In addition, the current program row can be shifted to the next program row when the mobile shaft reaches the set position or when a time P (msec) is set.

Since the tight contact position between the upper and lower molds was 30.000 mm when the molds were previously heated to 705° C. and a load in molding acted on the molds, the position of 29.000 mm (P2) which was 1.0 mm below the tight contact position was set. As described above, the drive unit 8 is driven by the control unit 28, and the mobile shaft 9 is moved upward at a moving speed of 20 mm/min by torque control until the upper and lower molds reach the position of 29.000 mm 1.0 mm below a position where the molds are set in a final closed state. Therefore, the glass material 30 is pressed by the upper and lower molds 6 and 13 to be molded. The set speed is a speed at which the mobile shaft can be pressed by the set torque because priority is given to the torque control. Note that the thickness of the glass after pressing is expected to be 3.500 mm according to calculation based on the gap between the upper and lower molds.

When the mobile shaft reaches the position in response to the above command, a command:

G200Z40.000F20I10E1V1 of a row indicated by address 120 of the program is executed as the next torque control instruction.

In this case, a G200 code will be described below. The G200 code is a torque control code developed for an optical element molding apparatus, and is a command for moving the mobile shaft at a speed of F (mm/min) to the set position of Z (absolute amount; mm from the origin) to perform torque control by a pressing force of I (kgf). Feedback control is performed to hold the set pressing force. For this reason, in response to the command of the row indicated by address 120, the mobile shaft is moved at a speed of 20 mm/min to a position of 40.000 mm from the origin to perform torque control by a pressing force of 10 kgf (F2).

More specifically, when an E1 code is written in the program, a current value applied to the servo motor 8a serving as a drive source is closed-loop-controlled such that an actual pressing force is detected by the load detector 8b, an output from the load detector 8b is received by the control unit 28 as a feedback signal, and the set pressing force is held. In addition, the current program row can be shifted to the next program row by causing the mobile shaft to reach the set position or by a forced stepping code V.

In this case, the reason why the set position is set to be a position (virtual tight contact position) 40.000 mm above the actual mold contact position is follows. That is, even if the control is performed according to the command of torque control, when the mobile shaft reaches the set position, priority is given to the position, and the current program row is shifted to the next program row. For this reason, in the program of the row indicated by address 120, the position is set to be a position (virtual tight contact position) 40.000 mm above the actual mold tight contact position, and the current program row is shifted to the next program row by the forced stepping code V1. More specifically, since the glass material 30 in molding is held under the torque feedback control by a preset pressing force=10 keg (F2) which does not deform the glass material 30, the thickness of the glass material 30 in molding does not change.

When Time 1' is detected by the timer, the infrared lamp 20 is turned off, the cooling process is started. Meantime, however, torque feedback control is performed by the pressing force of 10 kgf which does not deform the glass material 30. For this reason, the mobile shaft 9 moves such that a contraction amount of the shaft generated in the cooling process is absorbed, and the moving amount is equal to the contraction amount. Therefore, the gap between the upper and lower molds 6 and 13 does not change. That is, the thickness of the glass material 30 in molding does not change. In addition, the pressing force of 10 kgf always acts on the glass material 30, and the upper and lower molds 6 and 13 are in contact with each other. For this reason, the pressing force acting on the glass material 30 and a cooling state in the glass material can be uniformed. Furthermore, since the glass material 30 does not move, the final pressing operation (to be described later) does not performed in a state wherein the glass material 30 is "offset".

When the temperature reaches a temperature 565° C. (Temp 2) which is set in advance and slightly higher than the transition point, the forced stepping code V1 is output, a command:

G100Z29.150F20I500P30000E1 of a row indicated by address 130 in the program is executed. In response to this command, the final pressing operation is performed, and the same torque feedback control as in the command of the row indicated by address 120. More specifically, the torque control is performed by a pressing force of 500 kgf (F3) such that the moving shaft is moved at a moving speed of 20 mm/min to a position (P3) of 29.150 mm from the origin. Since the transfer surface of the mold is pressed on the glass material again by the set pressing force of 500 kgf (F3), the transfer characteristics can be made further reliable.

Since it is confirmed that the mobile shaft 9 moves upward by 0.15 mm in this step, the thickness of the optical element obtained as a result is expected to be 3.350 mm. This instruction is executed until the mobile shaft 9 reaches the set position or the set time is up.

The moment the mobile shaft 9 reaches the set position, a command:

G200Z40.000F20I50E1V2 of a row indicated by address 140 in the program is executed, and a pressing force=50 kgf (F4) which is set in advance and does not deform the glass in molding is held by the torque feedback control. The torque feedback control is kept executed until the temperature of the glass reaches 557° C. (Temp 3=glass transition point).

When the temperature reaches 557° C., and the forced stepping code V2 is output, a command:

G200 Z40.000F20I30E1V3 of a row indicated by address 150 in the program is executed, the torque feedback control is switched to the torque feedback control using a set pressing force of 30 kgf (F5). This process is formed to hold contact between the upper and lower molds and to uniform the pressing force acting on the glass material and the cooling state in the glass material. Since this operation is performed at the transition point or less, the shape of the glass material does not change.

When the temperature of the glass material 30 reaches a temperature of 220° C. (Temp 3), a forced stepping code V3 is output, and a command:

G01Z0.000F500 of a row indicated by address 160 in the program is executed. The mobile shaft 9 moves at a moving speed of 500 mm/min to the origin. Thereafter, the molds are opened, the molding process is ended.

Press molding was performed by the above molding profile 35 times. The expected thickness of the optical element was 3.350 mm. Since the profile irregularities of the upper and lower molds 6 and 13 were about $\lambda/10$ ($\lambda$=about 633 nm), the transfer characteristics were confirmed with reference to this value.

Any optical element obtained as a result had a thickness= 3.350 mm±1 μm and a profile irregularity=about $\lambda/10$. Therefore, highly accurate optical element having an expected thickness could be obtained.

As another program, a certain time is set with reference to time at which Soak Time is up, and the switching operation (switching operation between the pressing force of 10 kgf and the pressing force of 100 kgf) between the rows indicated by addresses 120 and 130 may be performed after the set time has passed. Although the infrared lamp 20 is used as a heat source, another heat source such as a high-frequency heat source may be used. In addition, although the load detector 8b is arranged between the drive unit 8 and the mobile shaft 9, the load detector 8b may be arranged between the servo motor 8a and the lower mold 13. Various modifications such as a modification in which a slow cooling zone is arranged in the process of cooling the glass material 30 can be performed as a matter of course.

According to the embodiment, after the glass material is heated to a temperature which is equal to or higher than the transition point and lower than the softing point, the shaft (mold) is moved by torque control to a set position slightly before a position where the upper and lower molds are set in the final closed state so as to reach the set position without molding the glass material by an excessive pressing force. At this time, since moving of the shaft (mold) is controlled by a servo motor, positioning can be accurately performed at good reproducibility.

As soon as the shaft reaches the set position while the torque control is performed, the control is switched to torque control using a small force, and torque feedback control is performed by a small force which does not deform the glass material. At this time, the positional control and the torque control can be apparently performed at once. Thereafter, even if the cooling process is started, the thickness of the glass material in molding can be prevented from being changed, and the state wherein the molds are in tight contact with the glass material can be held. As a result, a highly accurate optical element having thickness reproducibility can be obtained.

When the final pressing operation is performed when the temperature of the glass material becomes almost transition point Tg, the transfer characteristics between the molds and glass material can be improved, and the accuracy of the molded optical element can be further improved.

[Second Embodiment of Origin Position Correcting Method]

The origin position is set to be a position where the upper and lower molds are in tight contact with each other in the first embodiment of origin position correction method. In the second embodiment, the position detection terminal 31 and the limit switch 29 shown in FIG. 1 are arranged, a position where the position detection terminal 31 reaches the upper-limit portion of the limit switch 29 is set as the origin position.

In the control unit of this molding apparatus, an ideal tight contact position is set in advance (for example, a position form 50.000 mm from the origin). The offset amount of the origin position is set (for example 0.123 mm).

When a machine initialize signal is supplied to the molding apparatus, an origin detecting operation is performed by the limit switch 29 attached to the intermediate plate shown in FIG. 1 and an encoder incorporated in the servo motor 8a. That is, the servo motor 8a is driven to move the mobile shaft 9 upward. With upper moving of the mobile shaft 9, the position detection terminal 31 attached to the mobile shaft 9 reaches the upper-limit portion of the limit switch 29. This position is the origin. The mobile shaft 9 moves upward further, the mobile die 14 is brought into tight contact with the fixed die 7 (for example, these dies are brought into tight contact with each other at a position of 50.003 mm from the origin). At this time, although the upper and lower mold assemblies 4 and 11 are not heated by the lamp unit 19, the pressing force acting on the mobile die 14 pressed on the fixed die 7 is set to be equal to a pressing force used in actual press molding. While the timer counts several seconds, this pressing state is held. Thereafter, the difference (0.003 mm) between the tight contact position (50.003 mm) and the ideal tight contact position (50.000 mm) which is set in advance is set as one of parameters for setting an origin offset amount.

More specifically, since an offset amount (0.123 mm) is set as one of the parameters in advance, the difference (0.003 mm) between the tight contact positions is added to the set offset amount. That is, the origin offset amount is given by the following equation:

origin offset amount=actual tight contact position ideal-tight contact position+set offset amount=50.003−50.000+0.123= 0.126mm=126 μm 126 μm is set as one of the parameters for the origin.

Therefore, in this state, when the origin detecting operation is performed again, the current stand-by position of the lower mold assembly 11 is 3 μm above the previous position. The stroke is shortened by 3 μm, the stroke to the tight contact position is 50.000 mm. With the above process, the origin position is corrected such that the stroke of the mobile shaft 9 from the stand-by position of the lower mold assembly 11 to the tight contact position between the upper and lower molds 6 and 13 is always kept constant.

An actual molding cycle is performed without setting the glass material 30 on the upper surface of the lower mold 13, and a tight contact position in heating is calculated in the same manner as in the first embodiment. This tight contact position in heating is input to the control unit 28 through the position detector of the servo motor 8a. An offset amount δ between the tight contact position at room temperature and the tight contact position in heating is calculated and input to the control unit 28.

The offset amount δ is calculated as described above, origin correction is performed in each molding process.

The upper and lower molds are brought into tight contact with each other again without heating the upper and lower molds, the origin offset amount is corrected on the basis of the tight contact position, and the origin position is corrected on the basis of the offset amount δ between the tight contact position at room temperature and the tight contact position in heating. This origin position is input to the control unit 28 as an origin position 0 and set in the position control circuit as origin position information after correction.

Press molding is performed on the basis of the corrected origin position information corrected in each molding process and obtained in heating.

The origin correcting operation described above is preferably performed each before the molding step is performed. When the origin correcting operation is performed, an offset of the tight contact point between the upper and lower mold assemblies caused by thermal expansion of the frame 1, the fixed shaft 2, and the mobile shaft 9 can be removed. As a result, the thickness reproducibility of a product can be further improved.

In addition, when the origin correcting operation is performed each time the molding is performed, a time for the molding cycle is prolonged by a time for the origin correcting operation. However, in a series of molding operations in which a loading operation of a glass material and extracting operation of a product are performed by using a robot, when the origin correcting operation is performed simultaneously with an exchange operation of a pallet on which the glass material or the product are placed, origin correction can be performed each time molding is performed without prolonging the cycle time.

The above embodiment describes that a tight contact position in heating (amount of offset of the tight contact position caused by heating) is obtained, and heating is not performed in origin correction. However, heating may be performed in origin correction, and the origin may be directly corrected without using the tight contact position in heating. In addition, in a press-molding method in which the thickness t2 is set to be 0, origin correction may be performed in the press molding.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method for manufacturing a molded glass object such that a glass material arranged between a fixed mold and a movable mold is press-molded at a predetermined molding temperature under predetermined molding conditions, comprising the steps of:

heating both said molds and the material to a predetermined heating temperature between a glass softening point and a glass transition point;

moving said movable mold and press-molding the material until said movable mold reaches a predetermined set position where said movable mold and said fixed mold are in contact with the material without being in contact with each other, the material being held at a temperature between a glass transition point and glass softening point;

applying, using a servo-motor, a predetermined pressing force by torque control, such that the pressing force does not deform the material, to said movable mold at the set position, thereby holding the material between both said molds;

cooling both said molds and the material until the temperature thereof is close to the glass transition point; and final press-molding the material between both said molds by a pressing force which can deform the material at a temperature close to the glass transition point.

2. A method for manufacturing a molded glass object such that a glass material arranged between a fixed mold and a movable mold is press-molded at a predetermined molding temperature under predetermined molding conditions, comprising the steps of:

heating both said molds and the material to a predetermined heating temperature between a glass softening point and a glass transition point;

moving said movable mold and press-molding the material by a predetermined pressing force which can move said movable mold to a predetermined set position where both said molds are in contact with the material without being in contact with each other, the material being held at a temperature between a glass transition point and glass softening point;

applying a predetermined pressing force which does not deform the material, to the movable mold at the set position, thereby holding the material between both said molds;

cooling both said molds and the material until the temperature thereof is close to the glass transition point; and final press-molding the material between both said molds by a pressing force which can deform the material at a temperature close to the glass transition point.

* * * * *